United States Patent Office 2,859,097
Patented Nov. 4, 1958

2,859,097

PREPARATION OF PLUTONIUM HALIDES

Norman R. Davidson, Sierra Madre, Calif., and Joseph J. Katz, Chicago, Ill., assignors to the United States of America as represented by the United States Atomic Energy Commission No Drawing. Application June 3, 1947
Serial No. 752,270

3 Claims. (Cl. 23—14.5)

This invention relates to a method for the preparation of plutonium halides and more particularly to the preparation of the trihalides of plutonium, namely, plutonium trifluoride, plutonium trichloride, plutonium tribromide and plutonium triiodide.

These halides of plutonium are useful in the preparation of the pure metal and are particularly well adapted to those separation processes in which the plutonium is separated from uranium and fission products by means of a fractional distillation of their respective trihalides.

In accordance with the process comprising this invention, an oxide of plutonium, or any compound which readily forms a plutonium oxide, is contacted with a halogenating agent selected from the group consisting of halides of carbon, halides of sulfur, halides of phosphorus, mixtures of carbon halides and halogen, mixtures of sulfur halides and halogen, mixtures of phosphorus halides and halogen, mixtures of sulfur and halogen, mixtures of carbon and halogen, mixtures of phosphorus and halogen, and mixtures thereof. Suitable plutonium compounds include plutonium hydroxides, plutonium oxalates, and plutonium nitrates either in the anhydrous or the hydrated state.

The above reaction is operable within extensive ranges of temperature and pressure. At higher temperatures the reaction takes place in the vapor phase, since the halides of sulfur, phosphorus, and carbon and the mixtures of halogen with sulfur, phosphorus and carbon, all but carbon are in the vapor state. In the vapor phase the reaction rate is not appreciable at temperatures below 700° C. unless excess halogen is present in the system. Reactions carried out at temperatures between 600° C. and 700° C. are advantageous in that the major proportion of the product is obtained without first being sublimed; however, in the majority of vapor phase reactions, the product is obtained as a sublimate since these are usually carried out at temperatures of the order of 800° C. which exceeds the vaporization temperature of the product desired.

Under increased pressure, the reaction between plutonium oxide and halogen in the presence of sulfur, phosphorus or carbon or in the presence of their halides takes place at a considerably lower temperature of the order of 250° C. to 300° C. in the presence of excess halogen.

Suitable vapor- or liquid-phase halogenating agents for plutonium oxide include carbon tetrachloride, carbon tetrabromide, sulfur mono- and dichloride, and sulfur mono- and dibromide, and the tribromide, trichloride, pentabromide and pentachloride of phosphorus.

Both the liquid- and vapor-phase reactions are usually carried out within a quartz or glass reaction tube. The customary use of a platinum crucible within the reaction tube is omitted when the reaction takes place in the presence of such nonmetals as carbon, because the presence of platinum seems to catalyze the deposition of carbon within the reaction tube which results in the formation of an impure product.

The following are examples representatives of the halogenation of the oxide in the vapor phase.

Three milligrams of tetravalent plutonium hydroxide, which is oven-dried at 70° C. to form the oxide, is shaken into a quartz reaction tube attached to a vacuum apparatus. Carbon tetrachloride is admitted to the system at a pressure of about 50 mm. The system is evacuated and fresh carbon tetrachloride admitted at five-minute intervals du;ring the six-hour reaction period. Meanwhile, the quartz tube is heated to 750° C. in a copper furnace in order to convert the plutonium oxide to the trichloride. Apparently this reaction does not take place at a substantial rate until a temperature is reached at which the reaction product sublimes away from the starting material. Apparently, the time of heating depends upon the amount of plutonium oxide undergoing halogenation, since in a system identical with that just disclosed, approximately an eight-hour treatment with carbon tetrachloride vapor is required to convert 50 mg. of plutonium oxide to the plutonium trichloride.

At temperatures within 700° C to 900° C. the reaction with carbon tetrachloride alone proceeds to completion according to the following equation:

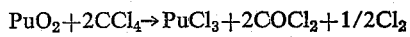

This may also be represented as

at this temperature, and the product collects as a green sublimate which resublimes at 720° C. in the presence of carbon tetrachloride at 20 mm.

Plutonium trichloride may also be synthesized at a lower temperature (550° C. in situ) without subliming the product. An example of such a case is shown by heating 2 mg. of tetravalent plutonium hydroxide with carbon tetrachloride vapor in a quartz reaction tube for four hours at 550° C. Under these conditions, the product formed consists of only 80% plutonium trichloride and 20% plutonium dioxide.

Another embodiment of this invention consists in the vapor phase halogenation of plutonium oxide by the use of a sulfur halide. A representative example of this reaction is shown by heating plutonium oxide to 800° C. with a vapor phase chlorinating agent having a composition of $SCl_2$ at a partial pressure of 40 mm. and chlorine at a partial pressure of 20 mm. to form sublimed $PuCl_3$. Such a vapor phase chlorinating agent is obtained by bubbling chlorine through $S_2Cl_2$ at 40° C.

The tribromide of plutonium is formed in a like manner by reacting plutonium dioxide in a quartz tube at 800° C. with bromine vapor and a sulfur bromide mixture obtained by passing bromine at 100 mm. pressure over sulfur at 120° C. The bromine vapor used in this reaction is present under a pressure of about 100 mm. and is dissolved in sulfur to form a red liquid mixture of sulfur bromide and bromine having a pressure of 50 mm. During the reaction, the flow rate of the bromine is maintained at about 5 cc./minute by means of a capillary at the outlet of this system leading to a vacuum apparatus. Several hours are required to convert 10 mg. of hydrated plutonium oxide to the green sublimate, plutonium tribromide.

The effectiveness of sulfur and bromine as a brominating mixture is indicated by the free energy change:

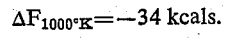

for the reaction:

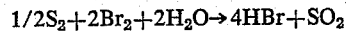

The reaction for the bromination of plutonium oxide by means of a bromine and sulfur bromide mixture is represented by the following equation:

$$PuO_2 + SBr_2 + 1/2 Br_2 \rightarrow PuBr_3 + SO_2$$

The halogenation reaction also takes place when free halogen contacts a heated mixture of plutonium oxide and either elementary carbon, sulfur or phosphorus.

Plutonium trihalides may be synthesized at relatively low temperatures by means of reactions between plutonium oxides and halides of sulfur, phosphorus or carbon carried out in the liquid phase under increased pressure. Phosphorus pentachloride, carbon tetrachloride and sulfur monochloride are the most suitable reagents.

A typical example for the liquid phase chlorination of plutonium oxide consists in reacting 3.5 mg. of vacuum-dried tetravalent plutonium peroxide with an excess of phosphorus pentachloride sealed within an evacuated quartz tube measuring 15 cm. in length and whose outside diameter measures approximately 4 mm. This tube is placed inside a larger bomb tube having an inside diameter of approximately 5 mm. and an outside diameter of 10 mm. and which contains phosphorus pentachloride. By means of this arrangement the bomb tube rather than the quartz tube withstands the pressure developed by the phosphorus pentachloride. The tube, encased in a capped iron pipe, is maintained at a temperature of 280° C. for a twelve-hour period. The quartz tube is then cracked and waxed to a vacuum line in order to sublime away the excess phosphorus pentachloride at 80° C. The residue is then heated to 450° C. in vacuo to remove other volatile products. The remaining product material is a light blue crystalline solid which is identified by X-ray analysis as $PuCl_3$.

Liquid phase chlorination of plutonium dioxide is also carried out with liquid carbon tetrachloride at 43 atmospheres pressure in the presence of about a 1% excess of chlorine at 280° C.

In a like manner, liquid phase chlorination of vacuum-dried plutonium peroxide with liquid $S_2Cl_2$ at 280° C. with chlorine present in an excess of several percent, yields $PuCl_3$. This reaction is carried out in a capillary glass bomb. A mixture of sulfur bromide and bromine is equally effective in the liquid phase as a halogenating agent for plutonium dioxide to form the tribromide of plutonium.

While there have been described several embodiments of this invention, it is to be understood that this process is capable of many modifications and therefore changes may be made without departing from the spirit and scope of this invention as described in the appended claims.

What is claimed is:

1. A process for the preparation of plutonium trihalides comprising contacting a compound of plutonium selected from the group consisting of plutonium oxides, plutonium peroxides, plutonium hydroxides, plutonium nitrates, and plutonium oxalates with a phosphorus halide at a temperature of between 250 and 300° C. and at superatmospheric pressure.

2. The process of claim 1 wherein the phosphorus halide is phosphorus pentachloride.

3. A process for the preparation of plutonium trihalides comprising contacting at an elevated temperature a compound of plutonium selected from the group consisting of plutonium oxides, plutonium peroxides, plutonium hydroxides, plutonium nitrates, and plutonium oxalates with a phosphorus halide at a temperature of about 280° C. and under superatmospheric pressure, and heating to about 450° C. at reduced pressure whereby volatile compounds are distilled away from the plutonium trichloride formed.

References Cited in the file of this patent

Roscoe et al.: Treatise on Chemistry, vol. 1, p. 211 (1911), MacMillan & Co., London.

Friend: Textbook of Inorganic Chemistry, vol. 7, part 3, page 294 (1926), Charles Griffin & Co., London.

Mellor: Comprehensive Treatise of Inorganic and Theoretical Chemistry, vol. 12, pp. 80–81 (1932), Longmans, Green & Co., London.

Seaborg: Chemical and Engineering News, vol. 23, pp. 2190–2193 (1945).